United States Patent [19]
Schroff

[11] 3,991,558
[45] Nov. 16, 1976

[54] TURBINE ENGINE STARTING FUEL CONTROL

[75] Inventor: Dennis E. Schroff, Indianapolis, Ind.

[73] Assignee: General Motors Corporation, Detroit, Mich.

[22] Filed: Dec. 1, 1975

[21] Appl. No.: 636,364

[52] U.S. Cl. .............................................. 60/39.14
[51] Int. Cl.² ......................................... F02C 7/26
[58] Field of Search .......... 60/39.14, 39.71, 39.82 P

[56] References Cited
UNITED STATES PATENTS

| | | | |
|---|---|---|---|
| 2,667,742 | 2/1954 | Kuzmitz | 60/39.14 |
| 2,694,899 | 11/1954 | Hague | 60/39.14 |
| 3,057,155 | 10/1962 | Rizk | 60/39.14 |
| 3,310,937 | 3/1967 | Smith | 60/39.14 |

Primary Examiner—Carlton R. Croyle
Assistant Examiner—L. J. Casaregola
Attorney, Agent, or Firm—J. C. Evans

[57] ABSTRACT

An engine start control circuit and fuel system for a gas turbine engine with a burner having a prevaporization chamber has metered fuel flow through a pilot and main fuel flow system in which a pilot nozzle of the air assist type is used to ignite fuel from a main fuel manifold that is supplied to the prevaporization chamber as a wall film of fuel. Control means are provided to energize the pilot fuel system to light the main fuel when the burner inlet temperature is below a predetermined set temperature corresponding to a temperature at which good fuel vaporization will occur on the walls of the prevaporization chamber. The control means also includes means operative in response to higher burner inlet temperatures to produce start and ignition of the main fuel manifold into the prechamber. The fuel system including means operative when the pilot is igniting the main fuel flow to control minimum pilot fuel by establishing a controlled pressure differential across a regulating orifice in the pilot fuel system by means of a preset pressure control valve.

3 Claims, 1 Drawing Figure

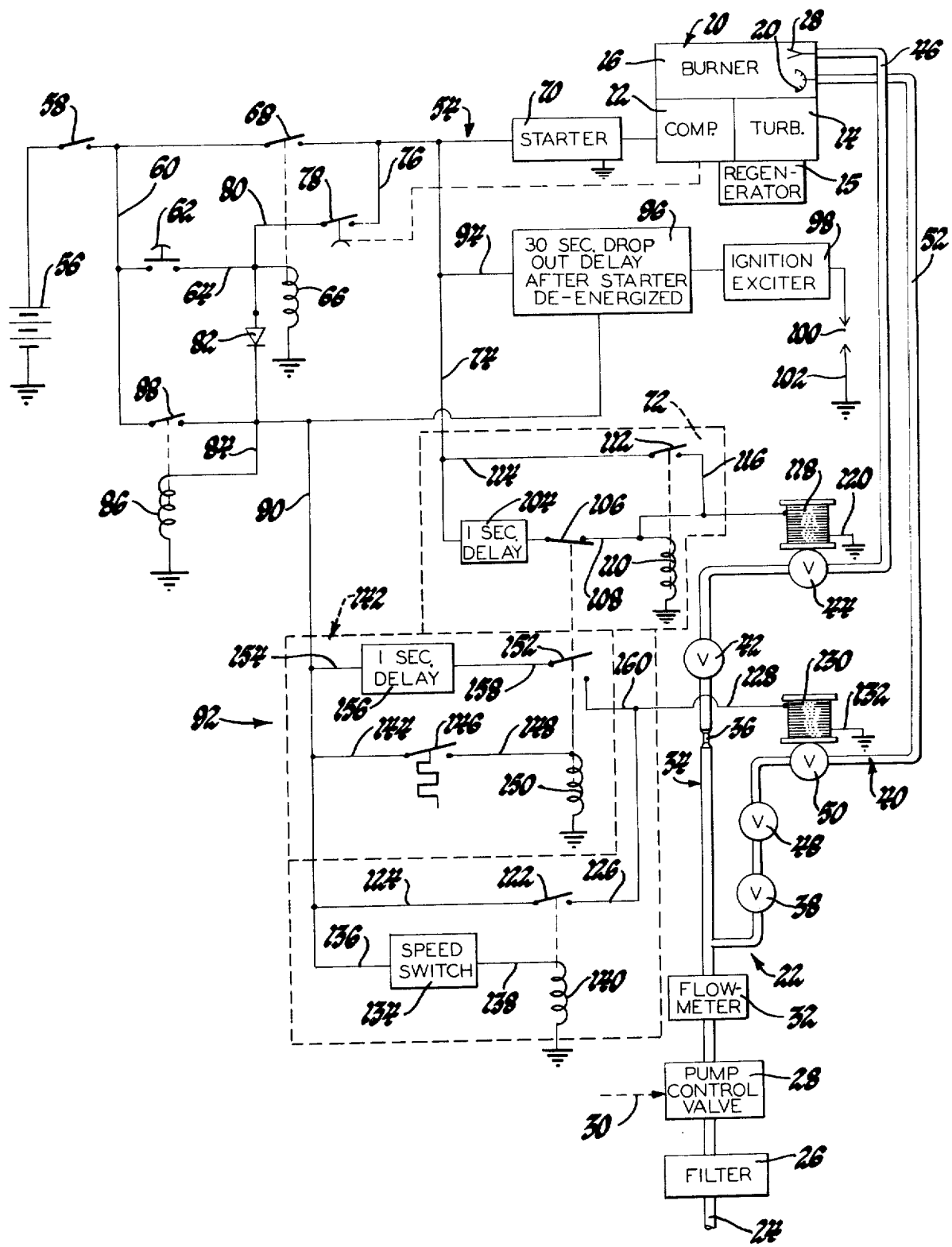

TURBINE ENGINE STARTING FUEL CONTROL

This invention relates to turbine engine start control systems and more particularly to turbine engine start control systems for sequentially controlling fuel flow to a pilot, air assist spray nozzle and main fuel manifold fuel distribution components in the burner of a turbine engine following energization of an igniter and starter.

In fuel control systems for automotive gas turbine engines of the type having a regenerator and a wall film evaporating type variable geometry burner it is desirable to carefully control both fuel supply and the energization of starter and igniter components in the system to assure lighting of the burner during a start phase of operation whether the engine is hot or cold.

An object of the present invention is to provide an improved control circuit for starting a turbine engine having a wall film evaporating type burner by the provision therein of pilot fuel supply means to direct a spray nozzle fuel flow to the burner during engine start and means to produce igniter energization to cause the pilot fuel to light main fuel flow until a predetermined compressor discharge pressure occurs and to further include a main fuel supply circuit that is conditioned for energization a predetermined time delay following starter energization and further including means operative when the engine is hot to produce main fuel flow during engine start in response to burner temperature reaching a level to assure vaporization of fuel distributed to the burner through the wall film prevaporization system.

Still another object of the present invention is to provide an improved start relay circuit for supplying power to a starter energization circuit, an igniter circuit, and to pilot and main fuel control circuits, the relay including a momentary start switch and a pair of hold switches one of which is in circuit relationship with a pilot fuel supply circuit and the other of which is in circuit relationship with a main fuel control circuit and wherein the first hold switch is deenergized in response to compressor discharge pressure and the second hold switch is deenergized in response to operation of a master switch and wherein the start relay circuit is latched at a starter offset point so that restart is not possible until a main ignition key switch has been cycled off, then on.

Yet another object of the present invention is to provide an improved starter control circuit for a gas turbine engine of the type having a burner with a wall film evaporating type fuel supply by the provision of a spray type nozzle in a pilot fuel control system conditioned following energization of an engine starter to supply pilot fuel to the spray nozzle while an igniter is energized to ignite main fuel flow to the wall film evaporator and wherein starter energization and pilot fuel flow are terminated in response to compressor discharge pressure and wherein further circuit means are included operative during hot engine start to condition a main fuel solenoid for distributing fuel to the wall film distributor in response to the burner temperature reaching a level that will vaporize fuel distributed as a film into the burner to cause main fuel to be ignited directly by the igniter without the pilot fuel supply.

Further objects and advantages of the present invention will be apparent from the following description, reference being had to the accompanying drawings wherein a preferred embodiment of the present invention is clearly shown.

The single FIGURE of the drawing is a schematic diagram of the starter and fuel control system of the present invention.

A gas turbine engine 10 suitable for automotive use includes a compressor 12, a turbine 14, a regenerator 15 and a burner 16 all shown in schematic form. The burner 16 has an air assist type pilot fuel nozzle 18 therein and a wall film type main fuel manifold 20. A representative example of the schematically illustrated nozzle 18 and manifold 20 are more specifically set forth in U.S. Pat. No. 3,899,881 issued Aug. 19, 1975, to Arvin et al.

In fuel supply systems of this type, it is difficult to ignite fuel distributed into the burner as a film across prevaporization chamber walls thereof until the burner temperature reaches a level at which the film will be quickly vaporized for mixture with air and for subsequent combustion. It is necessary to carefully control the start phase of operation to assure lighting of the burner during energization of a starter and an igniter and to maintain burner combustion until the temperature of the burner reaches a point at which vaporization of the film distributed fuel occurs.

Additionally, in burners of the type having a main fuel manifold that distributes fuel across the walls of a prevaporization chamber it is desirable to provide a control and fuel supply system that will have a cold start and hot start mode of operation during which pilot fuel is ignited to light the main fuel supply under cold start conditions and with the control system being operative to cause hot start ignition to be accomplished by ignition of fuel flow from a main fuel manifold across the walls of a film vaporizing system which are heated sufficiently to vaporize main fuel flow during hot start conditions.

To accomplish these objectives and as shown in the figure of the drawing, a fuel supply system 22 includes a fuel supply line 24 connected to the inlet of a fuel filter 26 having its outlet connected to a combination pump and control valve unit 28 which is under the control of a fuel supply signal input 30 to vary the amount of fuel flow across a flowmeter 32. The flowmeter is connected to a pilot fuel supply circuit 34 having a control orifice 36 therein in the order of 0.020 inches diameter. The orifice 36 establishes minimum pilot fuel during ignition of the main fuel supply by fuel flow through the air assist type pilot nozzle 18. The inlet pressure to the orifice 36 for establishing the minimum pilot fuel control is established by a pressurizing valve 38 in a main fuel supply system 40. The pressurizing valve 38 is in parallel flow relationship with the orifice 36 and is operative to establish a predetermined head in the order of 40 p.s.i. at the inlet to the orifice 36. The control of the valve 38 is capable of establishing a good control point at the inlet of the orifice 36 since the pressure drop across the nozzles 18 and the manifold 20 are negligible. In one working embodiment with minimum fuel flow across the orifice 36 the fuel flow was 23 pounds of fuel per hour at 40 p.s.i.

Downstream of the control orifice 36 the pilot fuel supply 34 includes a manual cut-off valve 42 that is in series flow connection with an electrical solenoid controlled pilot fuel valve 44 having its outlet connected through a conduit 46 to the inlet of the pilot fuel nozzle 18.

The main fuel supply system 40 also includes a manual shut-off valve 48 downstream of the pressurizing valve 38. It, in turn, is in series connection with an electrical solenoid controlled main fuel valve 50 having its outlet connected by conduit 52 to the inlet of the main fuel manifold 20 distributing fuel across the walls of the prevaporizing chamber in the burner 16.

The fuel supply system 22 is associated with a control circuit 54 that is energizable from a power source 56 electrically connected to an ignition key switch 58 thence through a conductor 60 to a momentary start switch 62. The momentary start switch 62 is electrically connected by means of a conductor 64 to one terminal of a solenoid coil 66 having its opposite terminal connected to ground. The solenoid coil 66 controls a relay switch 68 in a first run circuit for energizing a starter 70 and a pilot fuel control circuit 72 having a conductor 74 energized upon closure of the switch 68. Additionally, the circuit 54 includes a hold circuit for the coil 66 including a conductor 76 electrically connected in series with switch 68 and to one terminal of a compressor discharge pressure responsive switch 78 having its opposite terminal electrically connected by conductor 80 to a blocking diode 82 having its cathode terminal connected by a conductor 84 to one terminal of a coil 86 connected to ground. When coil 86 is energized it conditions a relay switch 88 that connects the input conductor 60 to a main fuel control run circuit 92 during the start phase of operation.

Additionally, the circuit 54 includes an ignition exciter circuit including a conductor 94 electrically connected to the conductor 74 and to the input of a delay circuit 96 having its output connected to one terminal of an ignition exciter 98 for energizing an ignition plug 100 connected to ground by a conductor 102.

The pilot fuel control circuit 72 includes a timer unit 104 of one second delay with its input connected to the conductor 74 and having its output connected to one terminal of a normally closed switch 106 having a fixed contact thereof connected by a conductor 108 to one terminal of a coil 110 that, when energized, closes a hold switch 112 to complete an energization circuit from the conductor 74 through a conductor 114 across the switch 112 thence through a conductor 116 connected to the input of a solenoid coil 118 for controlling pilot fuel flow through the valve 44. When the coil 118 is energized across a conductor 120 to ground the valve 44 is opened to permit orifice controlled flow of pilot fuel to the pilot nozzle 18.

The main fuel control circuit includes a relay switch 122 connected by a conductor 124 to the energization conductor 90 at one terminal thereof and having a fixed terminal connected by conductors 126, 128 to the input of a solenoid coil 130 connected by conductor 132 to ground. The relay switch 122 is under the control of a speed responsive switch 134 that has its input connected by conductor 136 to the conductor 90 and its output connected by a conductor 138 to a coil 140 thence to ground. When engine speed reaches 35 percent of the desired operating speed range the switch 134 will close to complete an energization circuit for the coil 140 to close the switch 122 to energize coil 130 to condition valve 50 open for supply of fuel to manifold 20.

Additionally, the main fuel supply circuit 92 includes a thermally responsive hot start circuit 142 having a conductor 144 connected to one terminal of a temperature responsive switch 146 for sensing the burner inlet temperature, switch 146 being normally open and operative to close above burner inlet temperatures of approximately 400° F representing a temperature at which fuel flow from the main fuel supply manifold 20 is readily vaporized on the walls of the prevaporization chamber of the burner 16. The fixed contact of the switch 146 is connected by a conductor 148 to the input terminal of a coil 150 having its output connected to ground. The coil, when energized, operates a hold switch 152 which is normally open during cold start conditions. The switch 152 is in series connection with the energization conductor 90 by means of a conductor 154 connected to the input terminal of a one second delay circuit 156 having its output connected by its conductor 158 to one terminal of hold switch 152. Its fixed contact is electrically connected by a conductor 160 to conductor 128 for selectively controlling energization of the coil 130.

Additionally, the coil 150 controls the pilot fuel control circuit 72 by conditioning the normally closed switch 106 open when the switch 152 is closed, both events occurring when the temperature switch 146 senses a burner inlet temperature in excess of 400° F.

A cold start mode of operation is initiated by closing the ignition key switch 58 and pressing the momentary start switch 62. This will concurrently energize coils 66, 86 to close switches 68, 88 to energize input conductors 74 and 90 to the pilot fuel control circuit 72 and main fuel control circuit 92. During initial start, the compressor discharge pressure is below a predetermined set value, for example, 6 p.s.i. This causes closure of the switch 78 to complete the hold circuits for both the coils 66, 86.

As soon as switch 68 is closed the starter 70 is energized to initiate rotation of the compressor and turbine spools of the turbine engine 10. During initial start, the circuit 96 is conditioned to cause immediate energization of the ignition exciter 98 to cause a spark to be generated within the burner in the vicinity of the pilot nozzle and main fuel manifold 20 within the prevaporization chamber of the burner 10.

Under cold start mode, during initial rotation of the compressor and turbine spools, the speed switch 134 will be open. Furthermore, the burner inlet temperature will be below 400° F and as a result the coil 130 is maintained deenergized. The fuel supply 22 will build up pressure to the solenoid control valve 44 and following a one second delay as established by the circuit 104 the coil 110 will be energized from the conductor 74 across the circuit 104, the normally closed switch 106 and the conductor 108. This closes the hold switch 112 to energize the coil 118 thereby directing pilot fuel to the nozzle 18. The pilot fuel flow into the burner 16 is ignited by the igniter spark plug 100 to establish a pilot flame for lighting fuel flow into the burner. Main fuel flow is initiated in response to the compressor 12 and turbine 14 accelerating to approximately 35 percent of the operating engine speed. At this point, the speed switch 134 will energize the coil 140 to close the switch 122 to in turn energize the coil 130 and open valve 50 for main fuel flow to manifold 20. The ignited pilot fuel will light the main fuel flow through the manifold 20.

Combustion products from the burner 60 will rapidly increase the speed of the turbine 14 and the resultant discharge pressure from compressor 12. When the compressor discharge pressure reaches 6 p.s.i., which represents about 45 percent of the engine operating speed, the normally closed compressor discharge pressure switch 78 will open to deenergize the coil 66 and condition the relay switch 68 open to deenergize the starter 70 and the pilot fuel control circuit 72. Main fuel circuit energization is maintained through the run switch 88 until the main ignition key switch 58 is opened.

The 30 second delay circuit 96 will maintain the ignition exciter 98 energized for thirty seconds following opening of the switch 68 to prevent flameout of the main fuel flow through the manifold 20 into the prechamber. The provision of a 30 second delay assures that the temperature of the prechamber walls will reach a temperature at which the main fuel flow will continually vaporize and burn to maintain burner operation following the cold start phase of operation.

Additionally, the control circuit 54 includes a hot start mode of operation where the burner inlet temperature is greater than 400° F. Under these conditions, the switch 146 is closed to energize the coil 150 and to cause the switch 152 to be closed and the switch 106 to be opened. Under such conditions, when the ignition key switch is closed and the momentary start switch is depressed to initiate starter energization and energization of the ignition exciter 98, the pilot fuel supply 72 is conditioned, since the switch 160 is opened, to maintain the coil 108 deenergized thereby to prevent fuel flow through the nozzle 18. Following a one second delay after hot start is initiated, the circuit 154 and switch 152 will complete an energization circuit through the coil 130 to open main fuel flow. Since the walls of the prechamber are above 400° F the fuel flow through the manifold 20 will be readily vaporized so as to be ignited by the ignition spark plug 100. The starter 70 and igniter 98 are maintained under the control of the closed switch 78 until the compressor speed reaches about 45 percent of design speed at which point the starter 70 is deenergized. Ignition exciter energization is maintained under the control of the circuit 96 for a predetermined thirty second run-out period to assure continued ignition of the main fuel flow to assure maintenance of the flame therein as main fuel flow continues under the control of the switch 88 and main fuel control circuit 92.

The aforedescribed system of main fuel ignition at hot burner inlet temperatures represents a preferred mode of ignition. Since the burner inlet temperature is greater than 400° F the compressor and turbine speed are relatively elevated and a substantial air flow is directed through the burner which tends to blow out a pilot fuel igniter. The ignition of vapor from a main fuel manifold 20 is easier to ignite under conditions where substantial air flows are passing through the burner 16 following flameout when the burner inlet temperature is elevated.

With the aforedescribed system and hot and cold start operating modes it was observed that cold start ignition occurred in time periods of from ten to twelve seconds and hot start ignition occurred in time periods from five to seven seconds. In both cases, ignition was self-sustained following the start and ignition termination phases of operation under both cold and hot start conditions.

It will be observed that closure of the ignition key switch 58 and the momentary master switch 62 applies electrical power to the fuel control circuit as well as to the starter energization circuit. Closure of the start switch 62 also energizes the hold starter relay for starter 70. In the preferred form, the starter for starter relay 70 is deenergized by the control when the engine speed reaches forty-five percent to sixty-five percent speed. The control logic of the circuit 54 is latched by the hold switches 68, 88 when the start switch 62 is depressed. The control logic of the circuit 54 is such that a restart of the system is not possible until the ignition switch 58 has been cycled off, then on.

Under cold start conditions, after pilot fuel and ignition have been initiated, the rate of turbine inlet temperature rise is between 100° F to 400° F per second until engine speed reaches twenty percent to fifty percent of the desired operating speed. The control will energize the run relay 122 to initiate fuel flow to the main burner manifold 20 at which point the burner temperature will continue to be increased to cause the engine to accelerate to idle speed. The run relay 122 remains energized for all normal running operation.

While the embodiments of the present invention, as herein disclosed, constitute a preferred form, it is to be understood that other forms might be adopted.

The embodiments of the invention in which an exclusive property or privilege is claimed are defined as follows:

1. A turbine engine start control system for sequentially operating a starter, igniter and fuel flow to start the engine with fuel flow through a spray nozzle pilot fuel supply and thereafter to maintain burner combustion solely by means of a main fuel distribution system connected to a main fuel supply comprising: starter control means including a momentary start switch and a hold circuit having a compressor discharge pressure responsive switch for maintaining the starter energized until the engine reaches a predetermined speed, circuit means for energizing an igniter at engine start including said starter control means, a pilot fuel solenoid valve, first circuit means including a normally closed hold switch for conditioning said pilot fuel solenoid valve to supply fuel to the spray nozzle following initial energization of said starter and said igniter, a main fuel solenoid valve, second circuit means for controlling fuel flow to the main fuel distribution system through said main fuel solenoid valve including a temperature responsive switch sensing burner inlet temperature and responsive to burner temperatures above that required to vaporize fuel flow from the main fuel distribution system to concurrently open said normally closed hold switch to condition said pilot fuel solenoid valve closed and to condition said main fuel solenoid valve to supply fuel to said burner, means for deenergizing the igniter following a predetermined time delay after said starter is deenergized, and means for maintaining said main fuel solenoid energized in response to engine speed.

2. A turbine engine start control system for sequentially operating a starter, igniter and fuel flow to start the engine with fuel flow through a spray nozzle pilot fuel supply and thereafter to maintain burner combustion solely by means of a main fuel distribution system connected to a main fuel supply comprising: starter control means including a key ignition switch, a momentary start switch and a hold circuit having a compressor discharge pressure responsive switch for maintaining the starter energized until the engine reaches a predetermined speed, circuit means for energizing an igniter at engine start including said starter control means, a pilot fuel solenoid valve, first circuit means including a normally closed hold switch for conditioning said pilot fuel solenoid valve to supply fuel to the spray nozzle following initial energization of said starter and said igniter, a main fuel solenoid valve, second circuit means for controlling fuel flow to the main fuel distribution system through said main fuel solenoid valve including a temperature responsive switch sensing burner inlet temperature and responsive to burner temperatures above that required to vaporize fuel flow from the main fuel distribution system to concurrently open said normally closed hold switch to condition said pilot fuel solenoid valve closed and to condition said main fuel solenoid valve to supply fuel to said burner, means for deenergizing the igniter following a predetermined time delay after said starter is deenergized, and means for maintaining said main fuel solenoid energized in response to engine speed, said second circuit means including a run relay switch means conditioned closed following operation of said momentary start switch and opened to terminate main fuel flow in response to said ignition key switch.

3. A turbine engine start control system for sequentially operating a starter, igniter and fuel flow to start the engine with fuel flow through a spray nozzle pilot fuel supply and thereafter to maintain burner combustion solely by means of a main fuel distribution system connected to a main fuel supply comprising: starter control means including a momentary start switch and a hold circuit having a compressor discharge pressure responsive switch for maintaining the starter energized until the engine reaches a predetermined speed, circuit means for energizing an igniter at engine start including said starter control means, a pilot fuel solenoid valve, first circuit means including a normally closed hold switch for conditioning said pilot fuel solenoid valve to supply fuel to the spray nozzle following initial energization of said starter and said igniter, a main fuel solenoid valve, second circuit means for controlling fuel flow to the main fuel distribution system through said main fuel solenoid valve including means for directing main fuel to the burner to be ignited by flame from the spray nozzle fuel under cold start conditions, a temperature responsive switch sensing burner inlet temperature responsive to burner temperatures above that required to vaporize fuel flow from the main fuel distribution system to concurrently open said normally closed hold switch to condition said pilot fuel solenoid valve closed and to condition said main fuel solenoid valve to supply fuel to said burner to cause main fuel to be ignited independently of the spray nozzle flame under hot start conditions, means for deenergizing the igniter following a predetermined time delay after said starter is deenergized, and means for maintaining said main fuel solenoid energized in response to engine speed.

* * * * *